(12) United States Patent
Ford

(10) Patent No.: US 7,581,854 B2
(45) Date of Patent: Sep. 1, 2009

(54) LIGHT EMITTING AND RECEIVING DEVICE

(75) Inventor: Timothy D. F. Ford, Beaconsfield (CA)

(73) Assignee: The Flewelling Ford Family Trust, Beaconsfield (CA)

( * ) Notice: Subject to any disclaimer, the term of this patent is extended or adjusted under 35 U.S.C. 154(b) by 332 days.

(21) Appl. No.: 11/673,832

(22) Filed: Feb. 12, 2007

(65) Prior Publication Data

US 2007/0189013 A1    Aug. 16, 2007

Related U.S. Application Data

(60) Provisional application No. 60/771,877, filed on Feb. 10, 2006.

(51) Int. Cl.
*F21V 5/00* (2006.01)
(52) U.S. Cl. .......................... 362/311.02; 362/311.06; 362/311.12
(58) Field of Classification Search .............. 362/311, 362/311.02, 311.06, 311.12
See application file for complete search history.

(56) References Cited

U.S. PATENT DOCUMENTS

| 6,097,549 A | * | 8/2000 | Jenkins et al. ............... 359/726 |
| 6,989,768 B2 | * | 1/2006 | DeMarco et al. ............. 340/981 |
| 2006/0120083 A1 | * | 6/2006 | Trojanowski et al. ....... 362/294 |
| 2006/0250801 A1 | * | 11/2006 | Trenchard et al. ........... 362/294 |

* cited by examiner

*Primary Examiner*—Laura Tso
(74) *Attorney, Agent, or Firm*—Goudreau Gage Dubuc

(57) ABSTRACT

There is disclosed an adjustable light emitting device for selectively projecting light directionally and omnidirectionally, the device comprising a stepped surface lens having a focal point and a light source positioned substantially along an optical axis of the lens and adapted for movement along the axis between the focal point and the lens. There is also disclosed a light emitting device comprising a partially collimated light source and a lens. When light emitted by the light source passing through the lens is simultaneously projected in an arc of at least 180° and further wherein a measured intensity of the projected light within the arc is at least one half of a maximum intensity of the emitted light. Both devices may also include a light sensor, or the light sensor may be included together with the lens in a separate package for use in light sensing applications.

23 Claims, 14 Drawing Sheets

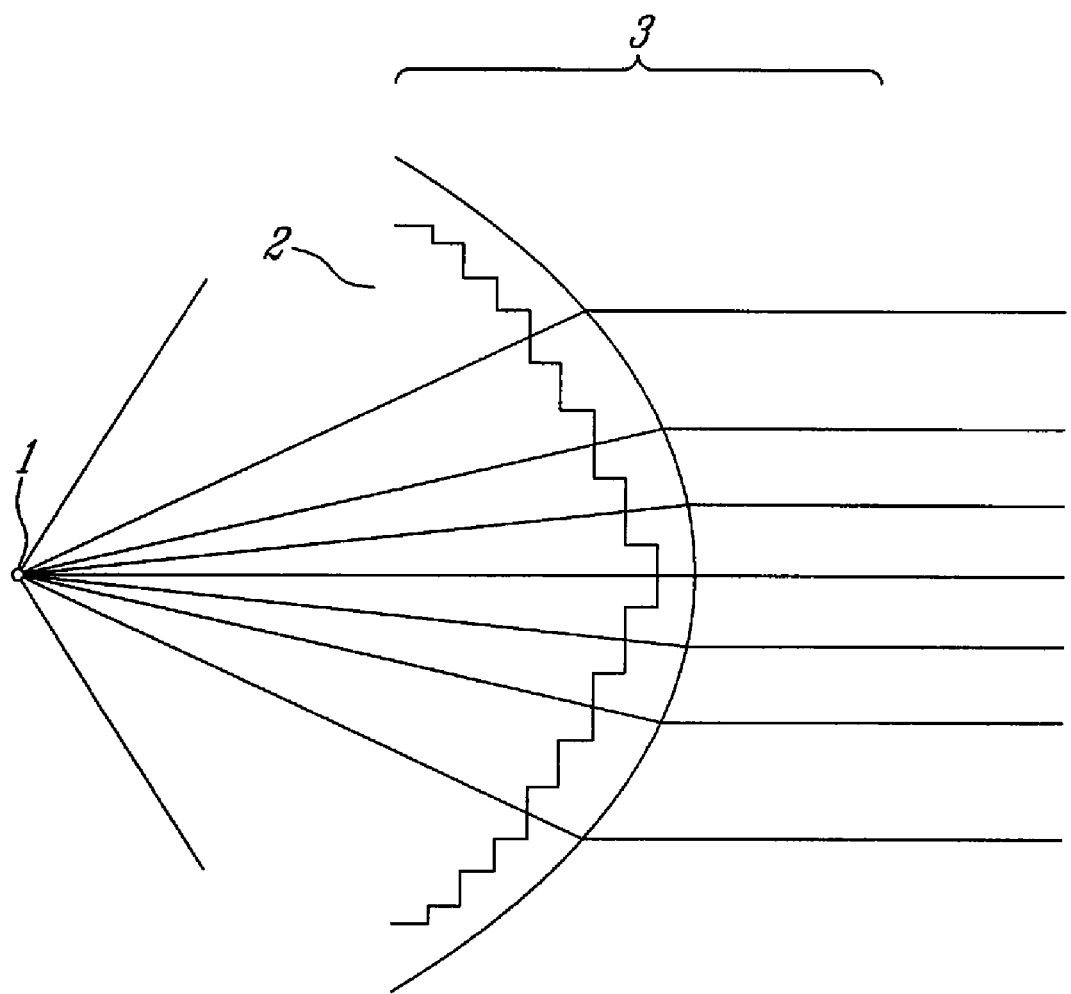
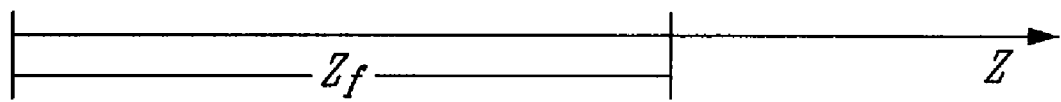
FIG. 1A

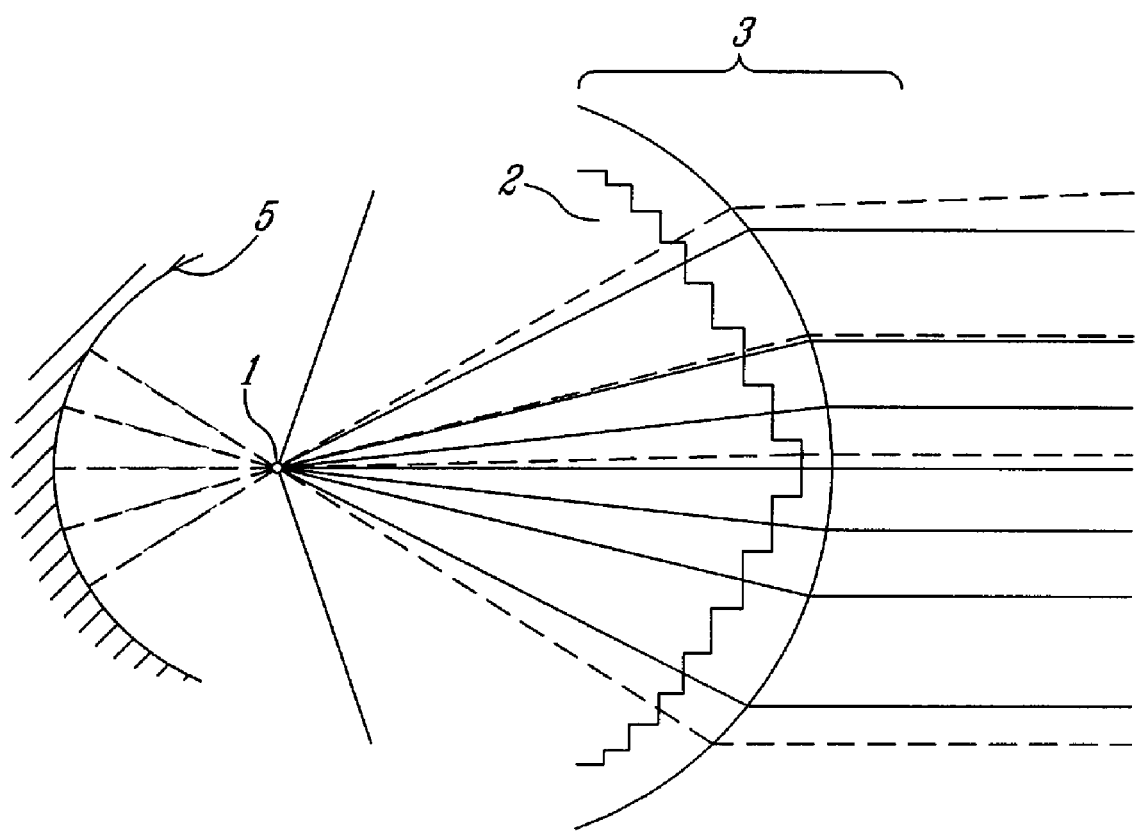
FIG_3

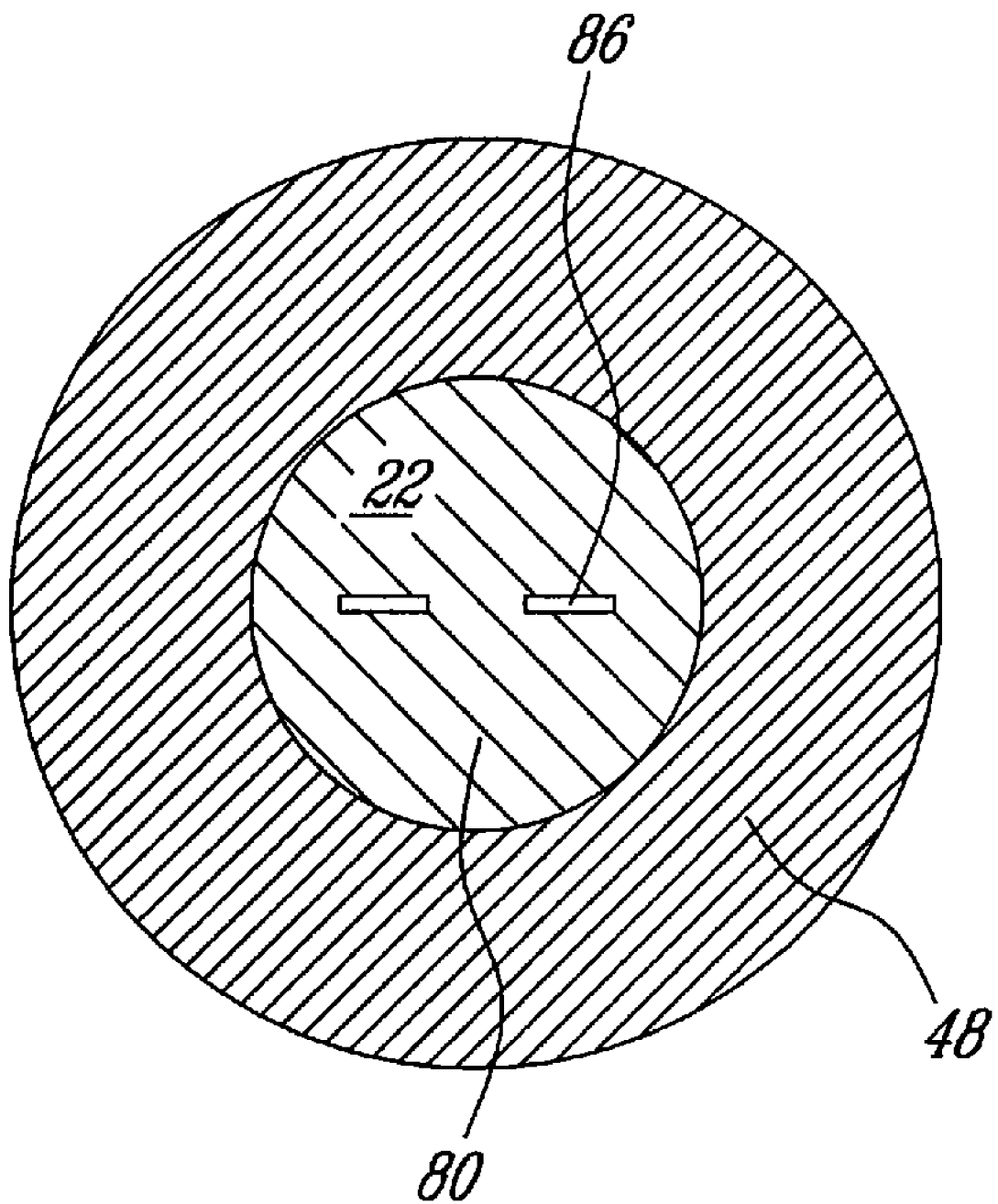
FIG_6

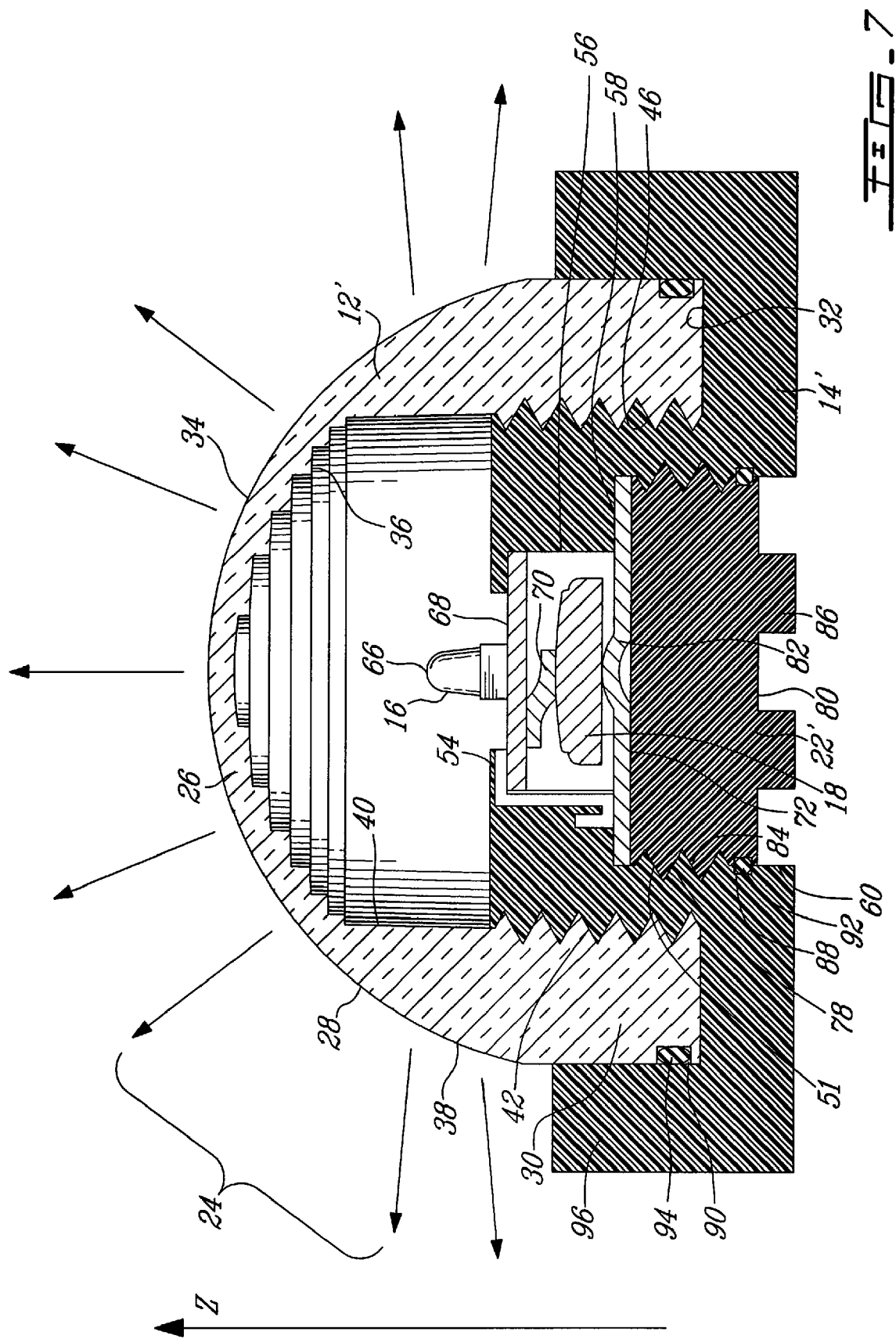

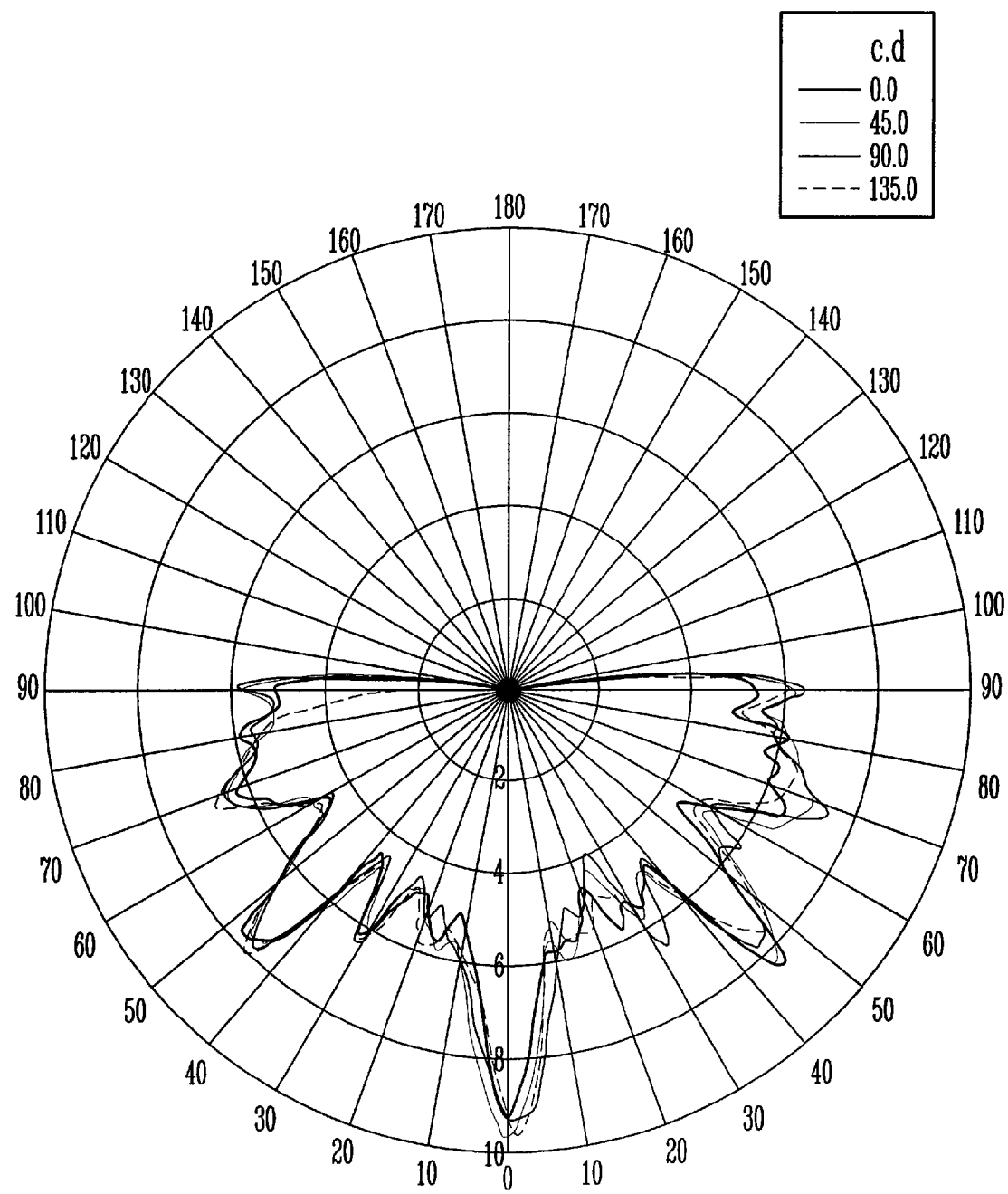
FIG_9B

LIGHT EMITTING AND RECEIVING DEVICE

CROSS REFERENCE TO RELATED APPLICATIONS

This application claims priority on U.S. provisional application No. 60/771,877, filed on Feb. 10, 2006 the entirety of which is incorporated herein by reference.

FIELD OF THE INVENTION

The present invention relates to a light emitting and receiving device. In particular, the present invention relates to a device comprising a light source and/or light sensor and an adjustable lens for use in combination with the light source and/or light sensor.

BACKGROUND TO THE INVENTION

The prior art discloses a variety of portable devices for emitting light comprising one or more light sources and a lens or other means for focusing or diffusing the light. Typically, such prior art devices are limited to one of two general applications: a first application such as a flashlight where the light source is focused, intensified and collimated along a general axis; and a second application such as a safety beacon where the light source is diffused such that the device is visible from a variety of directions.

One drawback of such prior art devices is that a device adapted to a first application is unsuitable for the other application, that is flashlights and the like generally do not make good beacons and beacons and the like are generally unsuitable where a focused light source is required.

In order to overcome these drawbacks, the prior art discloses diffusers and the like which can, for example, be attached to a flashlight in order to diffuse the light. However such diffusers constitute an additional piece or part which must be attached to the flashlight, typically absorb a fair amount of the light generated by the light source and are still not visible over a sufficiently wide angle to be suitable for many applications where a safety beacon or the like is called for. This is particularly the case when LEDs are used as the light emitted from the LED is already greatly collimated.

SUMMARY OF THE INVENTION

In order to overcome the above and other drawbacks there is disclosed an adjustable light emitting device for selectively projecting light directionally and omnidirectionally, the device comprising a stepped surface lens having a focal point and a light source positioned substantially along an optical axis of the lens and adapted for movement along the axis between the focal point and the lens.

There is also disclosed a light emitting device comprising: a partially collimated light source, and a lens. When light emitted by the light source passing through the lens is simultaneously projected in an arc of at least 180° and further wherein a measured intensity of the projected light within the arc is at least one half of a maximum intensity of the emitted light.

Additionally, there is disclosed a light sensing device comprising a stepped surface lens comprising an outer surface, an inner surface, an optical axis and a focal point and a light sensor positioned substantially at a location along the optical axis between the inner surface and the focal point. When light incident on a position on the outer surface is redirected by the lens substantially along a path between the position and the sensor.

BRIEF DESCRIPTION OF THE DRAWINGS

Reference will be made to the accompanying drawings, showing by way of illustration an illustrative embodiment of the present invention, and in which:

FIG. 1A provides a schematic illustration of possible projection optics for substantially directional illumination with a rounded stepped-surface lens in accordance with an illustrative embodiment of the present invention;

FIG. 3 provides a schematic illustration of possible projection optics for substantially directional illumination with a rounded stepped-surface lens and a concave reflector in accordance with an alternative illustrative embodiment of the present invention;

FIG. 6 is a bottom plan view of an adjustable light emitting device in accordance with an illustrative embodiment of the present invention;

FIG. 7 is a front sectional view of a waterproof adjustable light emitting device in omnidirectional mode in accordance with an alternative illustrative embodiment of the present invention

FIG. 9B is a polar plot of the intensity of a conventional high power LED in combination with the translucent lens cap of FIG. 8A.

DETAILED DESCRIPTION OF THE ILLUSTRATIVE EMBODIMENTS

Before proceeding with a detailed description of an illustrative embodiment of the present invention, it is important to first discuss certain principles in projection optics that are important to fully implement the following. Specifically, the use of stepped-surface and Fresnel-type lenses in conjunction with an axially movable light source is of particular importance.

Figure 1B:
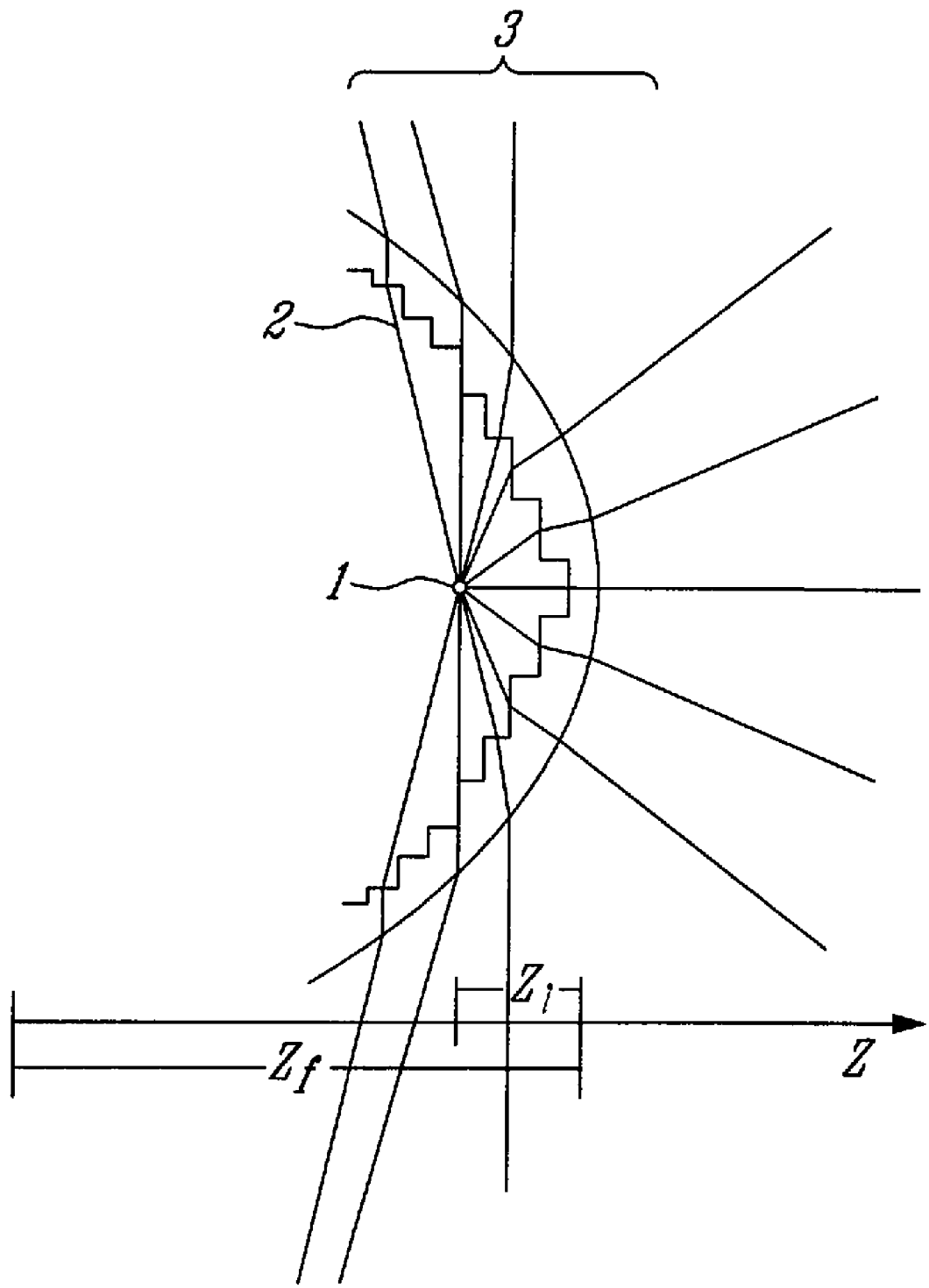
FIG. 1B provides a schematic illustration of possible projection optics for substantially omnidirectional illumination with a rounded stepped-surface lens in accordance with an illustrative embodiment of the present invention.

Referring first to FIG. 1A, and in accordance with an illustrative embodiment of the present invention, an approximated point light source 1 is positioned behind the concave face 2 of a generally spherical or rounded stepped-surface lens 3 at a distance $Z_f$, along the optical axis of the lens, approximately equal to the focal length of the lens. Basic geometrical optics in this scenario prescribes that the light refracted by the lens will be collimated on output and be projected directionally outward with minimal divergence. In FIG. 1B, the light source 1 is again positioned behind concave face 2 of the stepped-surface lens 3, but this time at a distance $Z_i$ inferior to the focal length of the lens, actually positioning the source within the hollow lens. Again based on simple optics, the light refracted by the lens in this scenario will be projected divergently outward. Furthermore, since the light source is actually positioned within the hollow lens, light will essentially be projected in all directions, or in other words hemispherically or omnidirectionally. Similarly, a light sensor or the like placed at a distance $Z_i$ inferior to the focal length of the lens will receive light incident on the lens from a wide variety of directions.

Figure 2A:
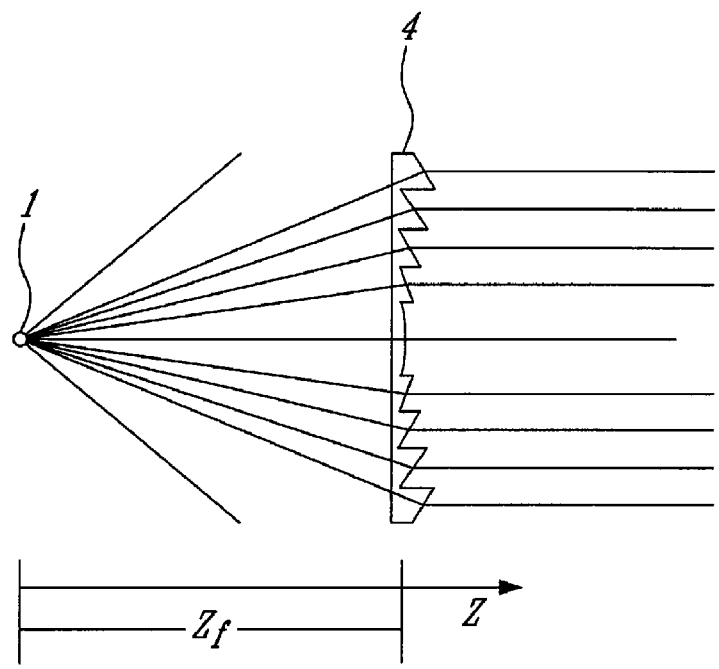
FIG. 2A provides a schematic illustration of possible projection optics for substantially directional illumination with a generally flat Fresnel lens in accordance with an alternative illustrative embodiment of the present invention.
Figure 2B:
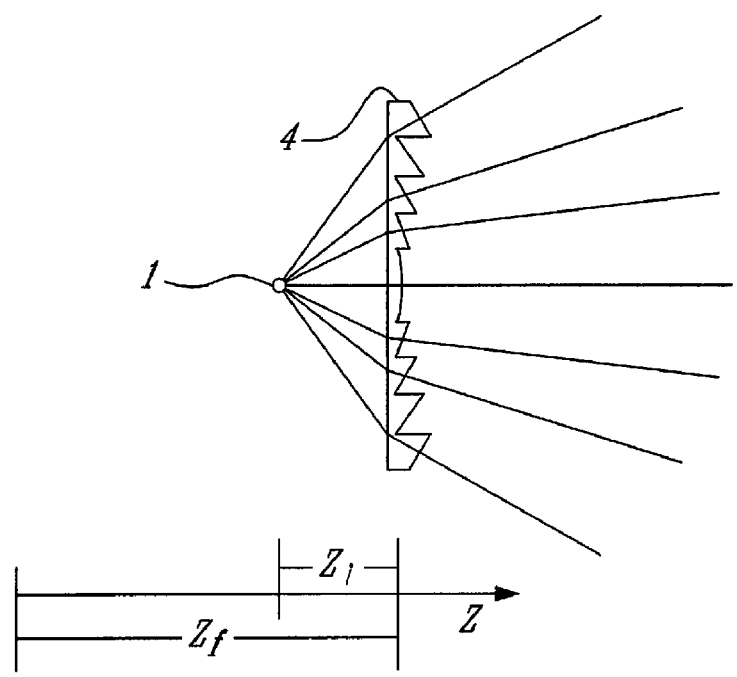
FIG. 2B provides a schematic illustration of possible projection optics for substantially omnidirectional illumination with a generally flat Fresnel lens in accordance with an alternative illustrative embodiment of the present invention.

Referring now to FIGS. 2A and 2B, and in accordance with an alternative illustrative embodiment of the present invention, light source 1 is now positioned behind a generally flat Fresnel lens 4. These lenses, which have become quite useful in a variety of applications due to their flatness, generally follow the same geometrical optics rules as conventional lenses. Consequently, when light source 1 is positioned at a distance $Z_f$ along the optical axis of lens 4 approximately equal to the focal length of same, the light refracted by the Fresnel lens will be collimated on output and be projected directionally outward with minimal divergence. Furthermore, when the light source 1 is positioned at a distance $Z_i$ inferior to the focal length of lens 4, the light refracted by the Fresnel lens will be projected divergently outward. Unlike the above example with stepped-surface lens 3, the light source cannot be positioned "within" the flat lens, and light from the source is thus not projected radially by the lens. As will be discussed hereinbelow in conjunction with a detailed description of an alternative embodiment of the present invention, omnidirectional illumination can be achieved using a translucent lens attachment or extension within which the light source may reside, and which may, if desired, comprise diffusive elements for enhanced radial illumination.

Finally, with reference to FIG. 3, and in accordance with a further alternative embodiment of the present invention, light source 1 is positioned behind the concave face 2 of the stepped-surface lens 3 of FIG. 1A, again at a distance $Z_f$ along the optical axis of the lens approximately equal to the focal length of the lens. This time, the light source is also fixedly positioned at a distance $Z_r$ in front of a generally spherical reflector 5; the distance $Z_r$ generally corresponds to the radius of curvature of the reflector such that reflector 5 images the light source onto itself, or very close thereto. Consequently, lens 3 will intercept both direct and reflected light from the source, and project, as in FIG. 1A, a substantially collimated beam with minimum divergence. If the light source is again moved to a distance relative to the lens inferior to the focal length of the lens (as in FIG. 1B), and if the distance between the light source and the reflector is maintained at $Z_r$, light will again be generally projected omnidirectionally.

Figure 4:
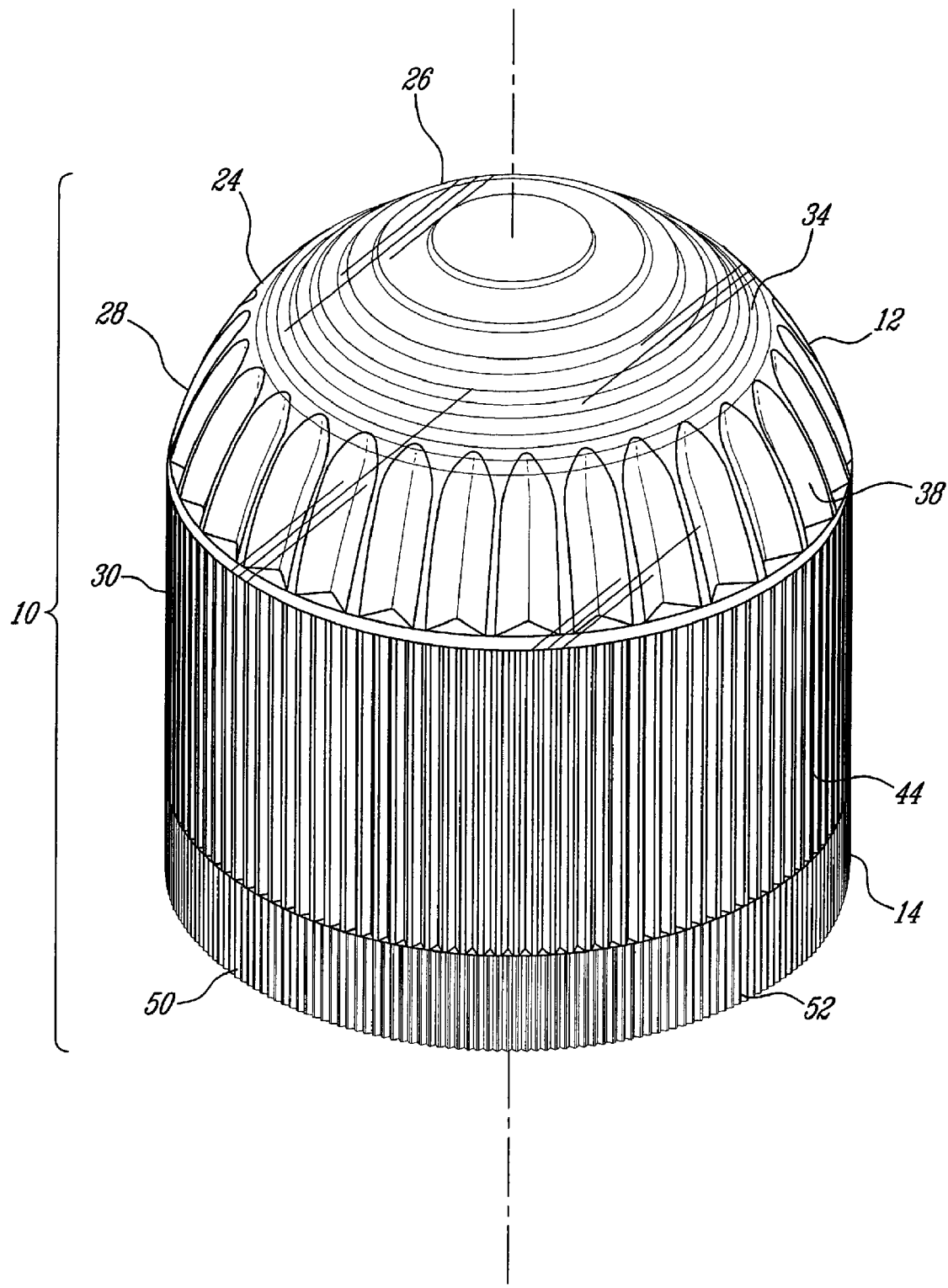
FIG. 4 is a front perspective view of an adjustable light emitting device in omnidirectional mode in accordance with an illustrative embodiment of the present invention.
Figure 5A:
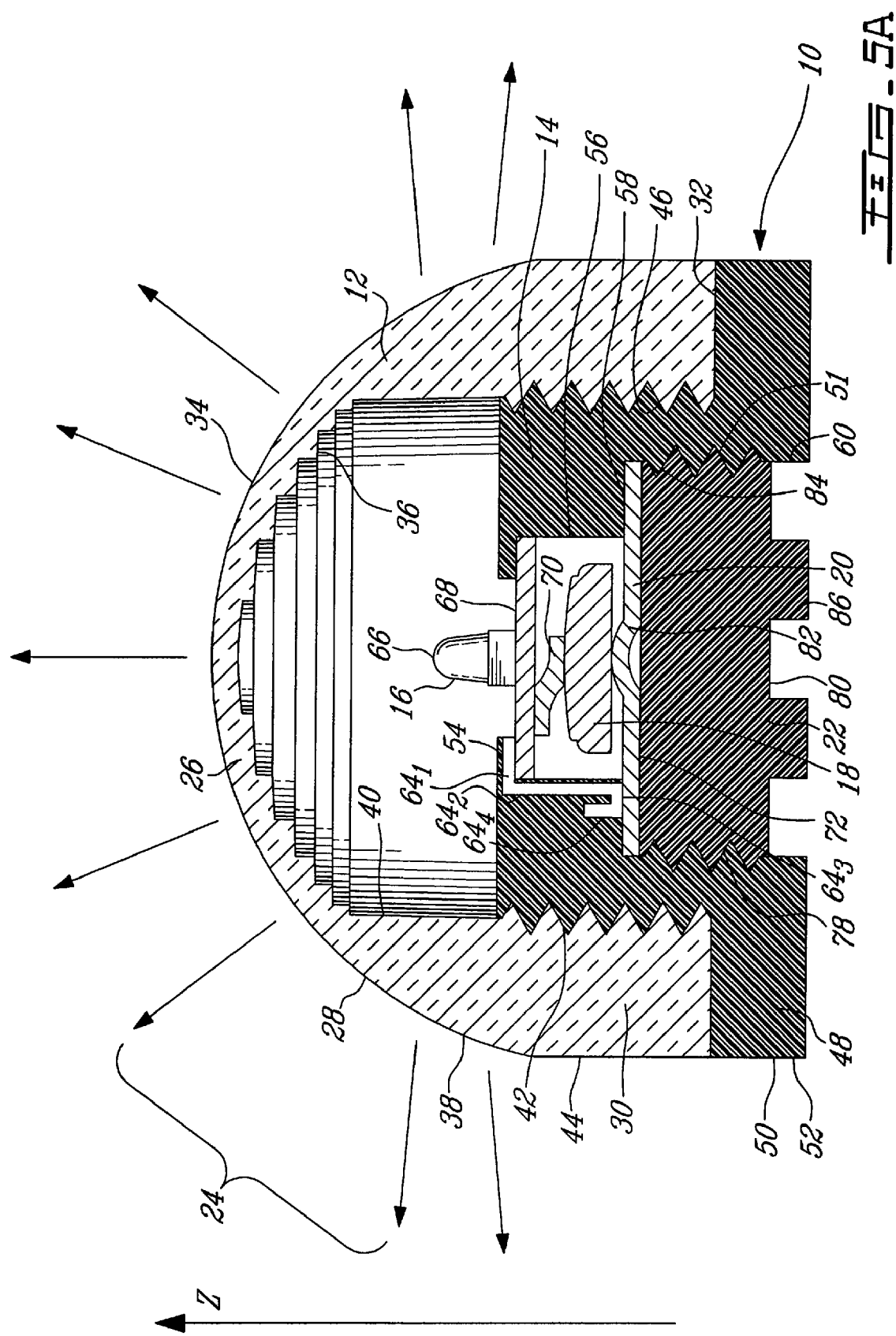
FIG. 5A is a front sectional view of an adjustable light emitting device in omnidirectional mode in accordance with an illustrative embodiment of the present invention.
Figure 5B:
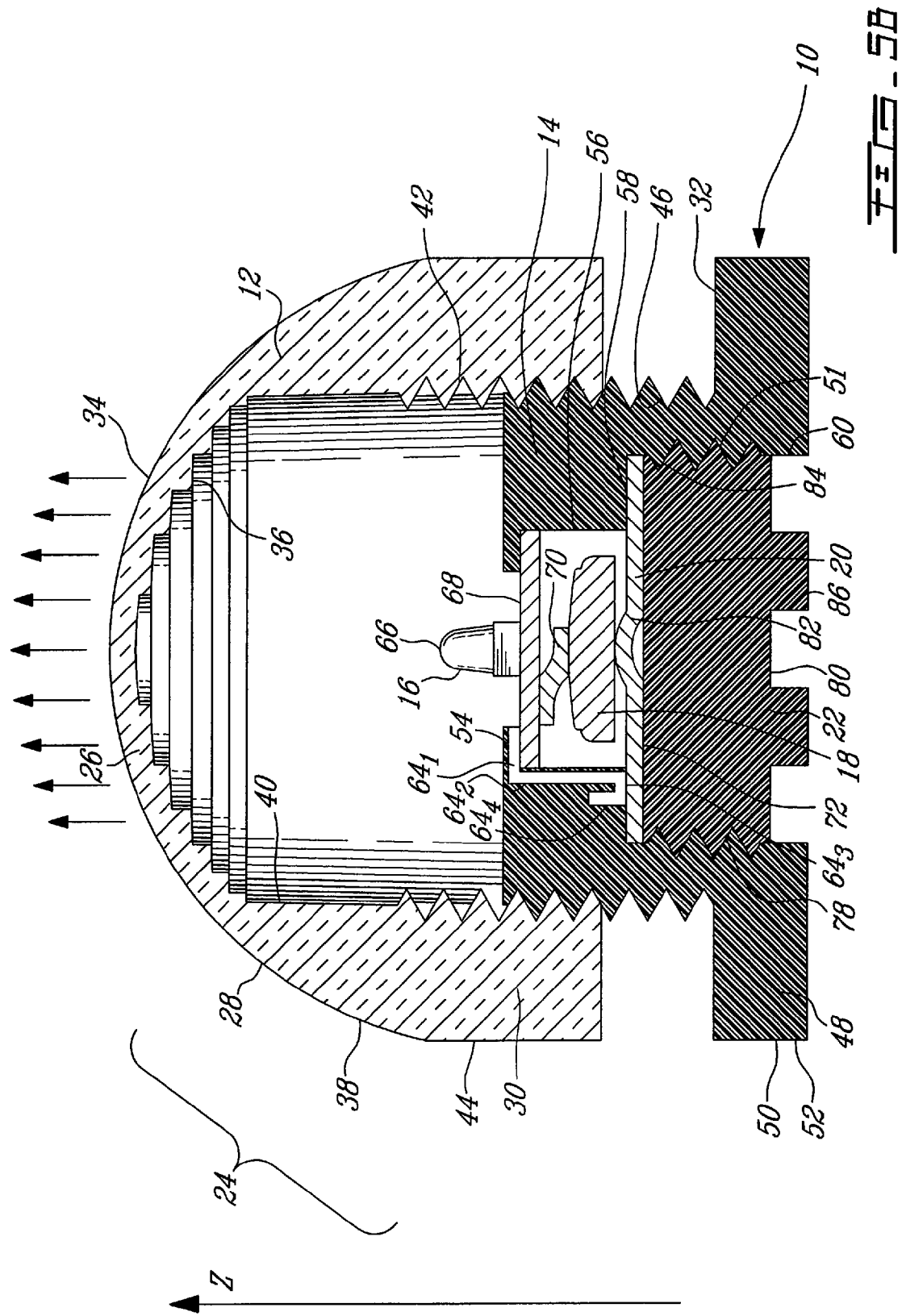
FIG. 5B is a front sectional view of an adjustable light emitting device in directional mode in accordance with an illustrative embodiment of the present invention.

Referring now to FIGS. 4, 5A and 5B, an adjustable light emitting device, generally referred to using the reference numeral 10, and in accordance with an illustrative embodiment of the present invention will now be described. Adjustable light emitting and receiving device 10 generally comprises an electrically non conductive hollow cap 12, an electrically non conductive casing 14, an electric load module such as a light module 16, a DC power source or battery pack 18 comprising at least one battery such as a coin cell battery, an electrically conducting contact plate 20, and an electrically non conductive plug 22. Though device 10 is presented here on its own, it will be obvious to a person skilled in the art that the device may be coupled to various carrying devices such as straps, belt clips, head gears and other items of the like without departing from the general scope of the invention.

Still referring to FIGS. 4, 5A and 5B, and in accordance with an illustrative embodiment of the present invention, the hollow cap 12 is generally made of molded, translucent, and electrically non-conductive plastic material such as polycarbonate. The hollow cap is comprised of a closed dome 24, forming a lens 26 at the top thereof and a generally annular diffusive region 28 therebelow, and a threaded cylindrical section 30 extending downwardly therefrom to a cap base 32. The lens, illustrated here as a rounded stepped-surface or Fresnel-type lens as described hereinabove, consists of a rounded or spherical outer surface 34 and a cylindrically symmetric stepped inner surface 36. The diffusive region, generally flowing downwardly from the above lens, comprises a plurality of diffusive elements 38 on its outer surface, such as radial cuts, grooves or protrusions, and a cylindrical inner surface 40. Cylindrical section 30 also comprises a series of threads 42 on its inner surface, and a series of grip ribs 44 on its outer surface. Note that though dome 24 is generally translucent, cylindrical section 30 need not be, and in some applications, may be required to be opaque.

The one-piece casing 14 is generally made of opaque, molded and electrically non-conductive plastic material. Viewed from the outside, the cylindrically symmetric casing 14 generally comprises a hollow cylinder, defining a threaded outer cylindrical surface 46 for engaging threads 42 of cap 12, coupled to an annular foot 48 at the base thereof and extending radially outwards therefrom. The peripheral face 50 of foot 48 may comprise a set of grip ribs 52. Viewed from the inside, casing 14 presents a series inverted steps, starting with an annular lip 54 extending radially inwards from the top of the casing, a first inner cylindrical wall 56 extending axially downwards from the base of lip 54, an annular shoulder 58 extending radially outwards therefrom, and a second inner cylindrical wall 60 extending axially downwards from the base of shoulder 58. Inner cylindrical wall 60 is partially threaded with threads 62 for engaging threads 64 of plug 22 (discussed hereinbelow).

The interior face of casing 14 further comprises a single continuous hook-shaped channel 64 defined by consecutive channels $64_1$-$64_4$: radial channel $64_1$ extends across lip 54, axial channel $64_2$ extends downwardly therefrom along the first inner wall 56, shallow radial channel $64_3$ extends outwardly therefrom partly across annular shoulder 58, and short axial channel $64_4$ extends upwardly therefrom within the body of casing 14.

The light module 16 comprises a light source 66 mounted centrally on a circular printed circuit board (PCB) 68. The light source is preferably a high-intensity light emitting diode (LED), which can provide high optical power outputs for relatively low electrical power inputs. The selection of an appropriate light source based on output (intensity), wavelength (IR, visible, broad spectrum, etc) and durability for specific applications will be obvious to a person of skill in the art. PCB 68 is centrally mounted in casing 14 within first inner cylindrical wall 56 and rests under annular lip 54.

The light module 16 further comprises two contact members (terminals) 70 and 72. The first terminal 70 is generally spring loaded and is centrally coupled to the bottom of PCB 68 for connecting the top face of battery pack 18 to the light module. The second terminal 72 is peripherally coupled to the top of PCB 68, and is generally hook-shaped for securely coupling itself within the hook-shaped channel 64 of casing 14, thus securing light module 16 in place. As will be discussed hereinbelow, when plug 22 is fully screwed into casing 14, the bottom of hook-shaped terminal 72 connects with contact plate 20, which is itself in contact with the bottom of battery pack 18, to close the load circuit.

Figure 5C:
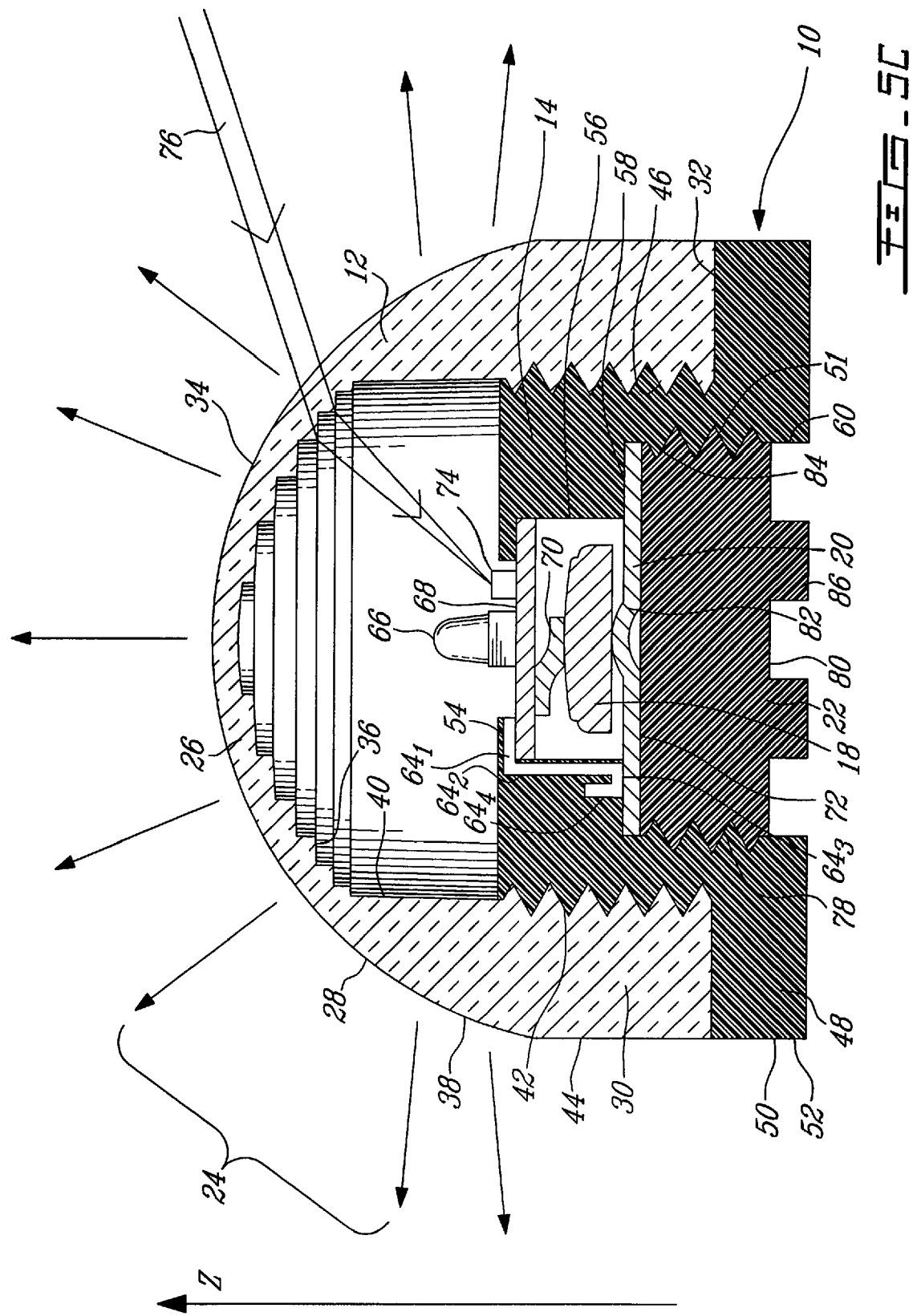
FIG. 5C is a front sectional view of an adjustable light emitting device in omnidirectional mode in accordance with an alternative illustrative embodiment of the present invention, wherein the light emitting device is also adapted for receiving and sensing an optical signal directed thereto.

Referring now to FIG. 5C, an alternative illustrative embodiment of the light emitting and receiving device 10 is presented wherein the light emitting and receiving device 10 is further comprised of a photosensor or photodetector 74 adapted for receiving and/or sensing an optical signal directed thereto. For instance, the photodetector 74 may be annularly disposed on the PCB 68 around the LED 66, or again a plurality of photodetectors 74 may be disposed thereat to detect a photosignal directed thereto by the translucent cap 12. Circuitry for interpreting a signal generated by the photodetector(s) 74 may be combined within the PCB 68 to, for instance, activate the LED 66 upon detection of an incoming optical signal, as in 76, to implement various device programming and/or switching functions, and the like.

Referring now to FIG. 6 in conjunction with FIGS. 5A and 5B, and in accordance with an illustrative embodiment of the present invention, the one-piece plug 22 is generally made of opaque, molded and electrically non-conductive plastic material. The plug is generally disc-shaped and is sized to fit within the second inner cylindrical wall 60 of casing 14. It comprises an upper circular face that holds contact plate 20 thereon, a partially threaded cylindrical wall 78 extending axially downwards therefrom, and a circular base 80 at the bottom thereof. Contact plate 20 is generally flat and circular, except possibly for a cylindrical/spherical protrusion 82 at its center for making contact with the bottom of battery pack 18 when the plug is in place. Cylindrical wall 78 is partially threaded with threads 84, set to engage threads 62 of casing 14. Finally, protruding tabs 86 extend axially and downwardly from circular base 80, providing screwing means for plug 22.

Referring now to FIG. 7, and in accordance with an alternative embodiment of the present invention, the adjustable light emitting device described hereinabove may be slightly modified to make it waterproof, and thus practical for applications where water may be an issue, such as in outdoor athletics, water sports, diving, and other activities of the like. Essentially, resilient sealing "O" rings 88 and 90 are respectively used on both alternative plug 22' and alternative cap 12' to provide a waterproof seal at respective junctions with alternative casing 14'. For example, an annular channel 92 is set in cylindrical wall 78 of plug 22', just below threads 84, for partial insertion of sealing ring 88 therein. As plug 22' is screwed into place, the sealing ring 88 is compressed between the walls of channel 92 and the flat segment of cylindrical wall 60, thus sealing the interior of device 10 from below. To seal the device from above, an annular channel 94 is set at the bottom of cylindrical section 30 of alternative cap 12' for partial insertion of sealing ring 90 therein. As cap 12' is screwed down, sealing ring 90 is compressed between the walls of channel 94 and the additional outer cylindrical wall 96 of alternative casing 14', thus sealing the interior of device 10 from above. Clearly, other sealing means may now be obvious to one skilled in the art. Namely, the use of a double seal ring configuration may be preferred for the adjustable cap in order to increase the quality of the water seal. Suitable modifications to the sealing means may be brought to the device in order to comply with specific sealing requirements.

The operation and activation of device 10, in accordance with an illustrative embodiment of the present invention, will now be described with reference to the above-cited illustrations. To activate the device, one must first secure light module 16 in place. This is accomplished by inserting the circular PCB 68 within cylindrical wall 56, aligning and securely coupling hook-shaped contact 54 within hook-shaped channel 64, and thus securely resting PCB 68 under annular lip 54. A battery pack 18, which may include for example at least one coin cell battery, is then provided and positioned within inner cylindrical walls 56. Plug 22 is then screwed into place by engaging threads 84 of same with threads 74 of casing inner wall 60, to shut the device from below. In the alternative embodiment illustrated in FIG. 7, sealing ring 88 is compressed between the walls of channel 92 and inner wall 60 as the plug is screwed into place, providing a water seal from below. If the plug is only partially inserted, the load circuit remains open as hook-shaped terminal 72 is not yet in contact with contact plate 20 (though battery pack 18 may already be held in place between contact 20 and spring-loaded terminal 70) and no light is emitted. When the plug is fully screwed in, contact is finally made between the bottom of hook-shaped terminal 72 and contact plate 20, thus closing the load circuit and activating the device.

With specific reference to FIGS. 5A and 5B, and still in accordance with an illustrative embodiment of the present invention, device 10 may be adjusted to project light either directionally forward in the positive z direction, as illustrated in FIG. 5B (directional mode), or hemispherically, as illustrated in FIG. 5A (omnidirectional mode). In either mode, cap 12 is at least partially screwed onto casing 14 by engaging threads 42 and 46 of the cap and casing respectively. In the alternative embodiment illustrated in FIG. 7 (omnidirectional mode), sealing ring 90 is compressed between the walls of channel 94 and wall 96 of alternative casing 14' to provide a water seal from above.

As the cap is screwed down onto the casing in the negative z direction, the distance between the lens 26 and the light source 66 is progressively reduced. As discussed hereinabove, the distance between the light source and the lens will define the directionality of the light emitted by the device. If the cap is only screwed in slightly to maintain a distance between the light source and the lens approximately equal to the focal length of the lens (FIG. 5B), light will be projected substantially directionally in the positive z direction. Alternatively, if the cap is screwed in fully so to rest cap base 32 on top of foot 48 (FIG. 5A), light will be divergently projected by the lens, and light emitted radially by the source will be scattered by diffusive elements 38, which will somewhat homogenize the omnidirectionality of the device in this mode.

Consequently, device 10 can provide both directional and omnidirectional illumination by simple adjustment of cap 12. Also, as discussed hereinabove with reference to FIG. 5C, the device may further comprise one or more light sensors 74 adapted for sensing and reacting to an incoming optical signal 76, even when such a signal is projected on the device 10 from an angle. Circuitry coupled to the PCB 68 or independently disposed within the device 10, may react to the signal generated by the light sensor 74 upon detection of the incoming optical signal 76 to perform various tasks that may include activating the LED 66 momentarily, switching the device ON or OFF, switching various illumination functions (pulsed illumination, continuous illumination, illumination wavelength when plural LEDs are used, etc.) and the like. In addition, by adjusting the axial position of the cap 12, a device's ability to detect the incident beam 76 as a function of the beam's angle of incidence may be varied.

A person of skill in the art will understand that other permutations and configurations may also be considered without departing from the general scope and nature of the present embodiment. Namely, the device 10 may be configured such that functions associated with the detection of incoming signals are not correlated with light emitting functions, or again, separate light emitting and light sensing devices may be considered.

It will also be apparent to a person skilled in the art that the substitution of the rounded stepped-surface lens illustrated in the above illustrative embodiments for a standard substantially flat Fresnel lens, as discussed hereinabove with reference to FIGS. 2A and 2B, or again for a modified rounded Fresnel-type lens, will not alter the general functionality of the device. Namely, one may opt to combine a flat Fresnel lens with a series of radial diffusive elements to achieve a same goal, while providing a generally flat, rather than rounded device.

Figure 8A:
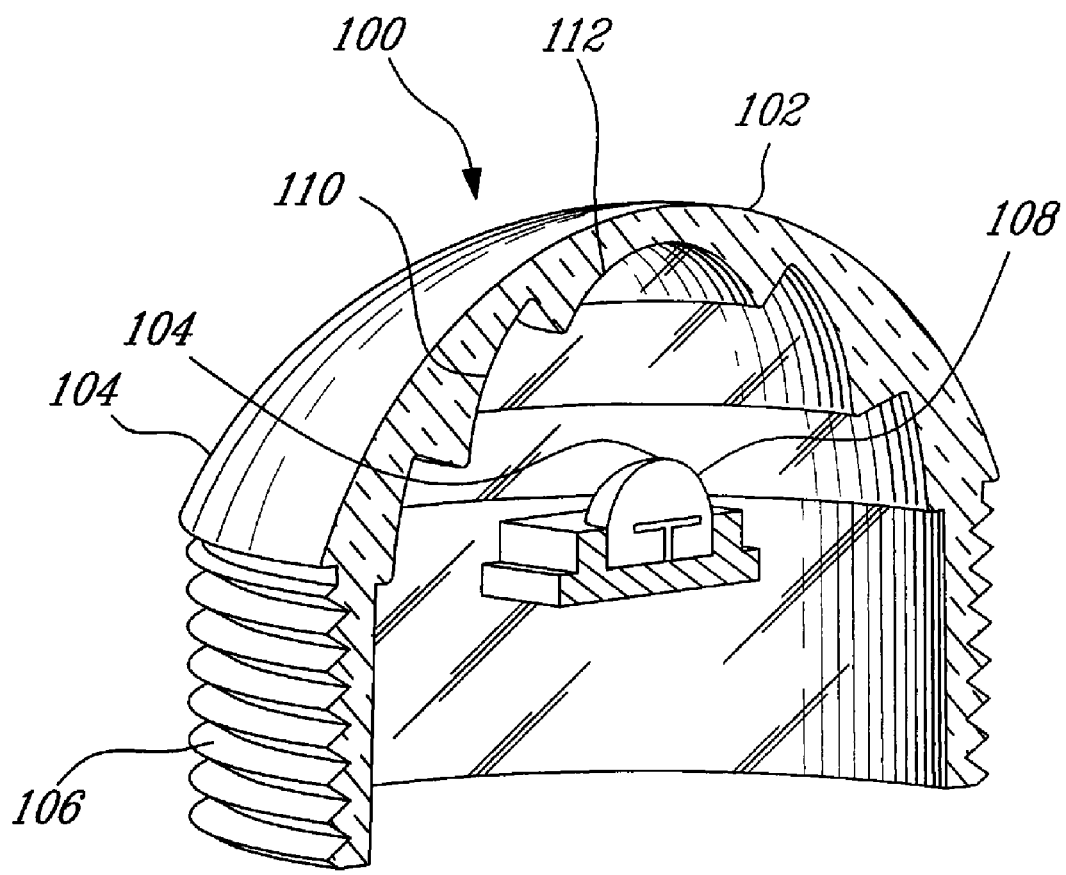
FIG. 8A is a perspective view of a cross section of a lens illustrating a modified interior structure of a translucent cap thereof, in accordance with a further alternative illustrative embodiment of the present invention.
Figure 8B:
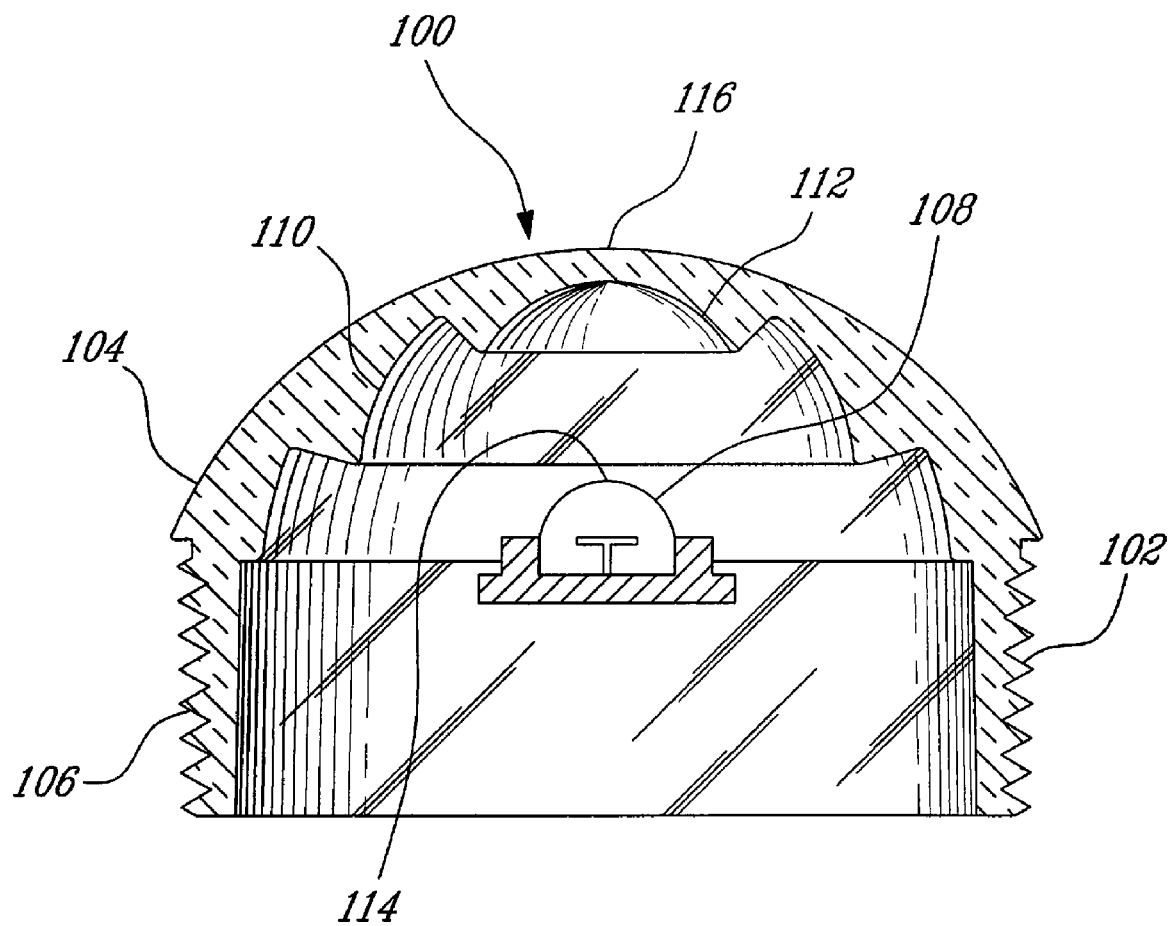
FIG. 8B is a side plan view of the lens in FIG. 8A.

Referring now to FIGS. 8A and 8B, a further alternative illustrative embodiment of the present invention is presented wherein an alternative adjustable light emitting device 100 is fitted with a modified Fresnel-type lens 102. The device 100, much like the device 10, is generally comprised of a translucent electrically non conductive cap 104 portion and a threaded portion 106 for mounting the lens 102 onto an inner casing (not shown) within which is mounted about a light source 108, such as a LED. Batteries, switches and circuitry (also not shown) for the activation of the LED 108 and operation of the device 100 are also included and should be apparent to a person of skill of the art upon reference to the above description of device 10.

The cap 104, much like the cap 12 of device 10 (FIG. 5), is generally molded of a translucent plastic material such as translucent polycarbonate to define the Fresnel-type lens 102 in a top portion thereof. As discussed hereinabove with reference to FIGS. 5A and 5B, the cap 104 may be adjusted axially to vary the dispersion of the light transmitted therethrough. As with device 10, when the cap 104 is axially adjusted away from the casing, light generated by the device 100 is emitted directionally (directional mode), whereas when the cap 104 is axially adjusted toward the casing, light generated by the device 100 is emitted hemispherically (omnidirectional mode). As will be apparent to a person of skill in the art, intermediate positions of the cap 104 will provide a progressively variable combination of directional and omnidirectional emissions.

In this embodiment, however, the lens 102 is generally comprised of a series of progressively inwardly curving steps, as in 110, moulded or otherwise formed on the inner surface of the lens 102. Unlike the squared stepped surface structure of lens 24 (see FIG. 5), the inwardly curving steps 110 are progressively rounded inwardly to define, at the apex thereof, a rounded inner dome surface 112. This modified structure provides improved light dispersion and dissipation characteristics when the device 100 is used in an omnidirectional mode while maintaining effective collimating characteristics in a directional mode.

Figure 9A:
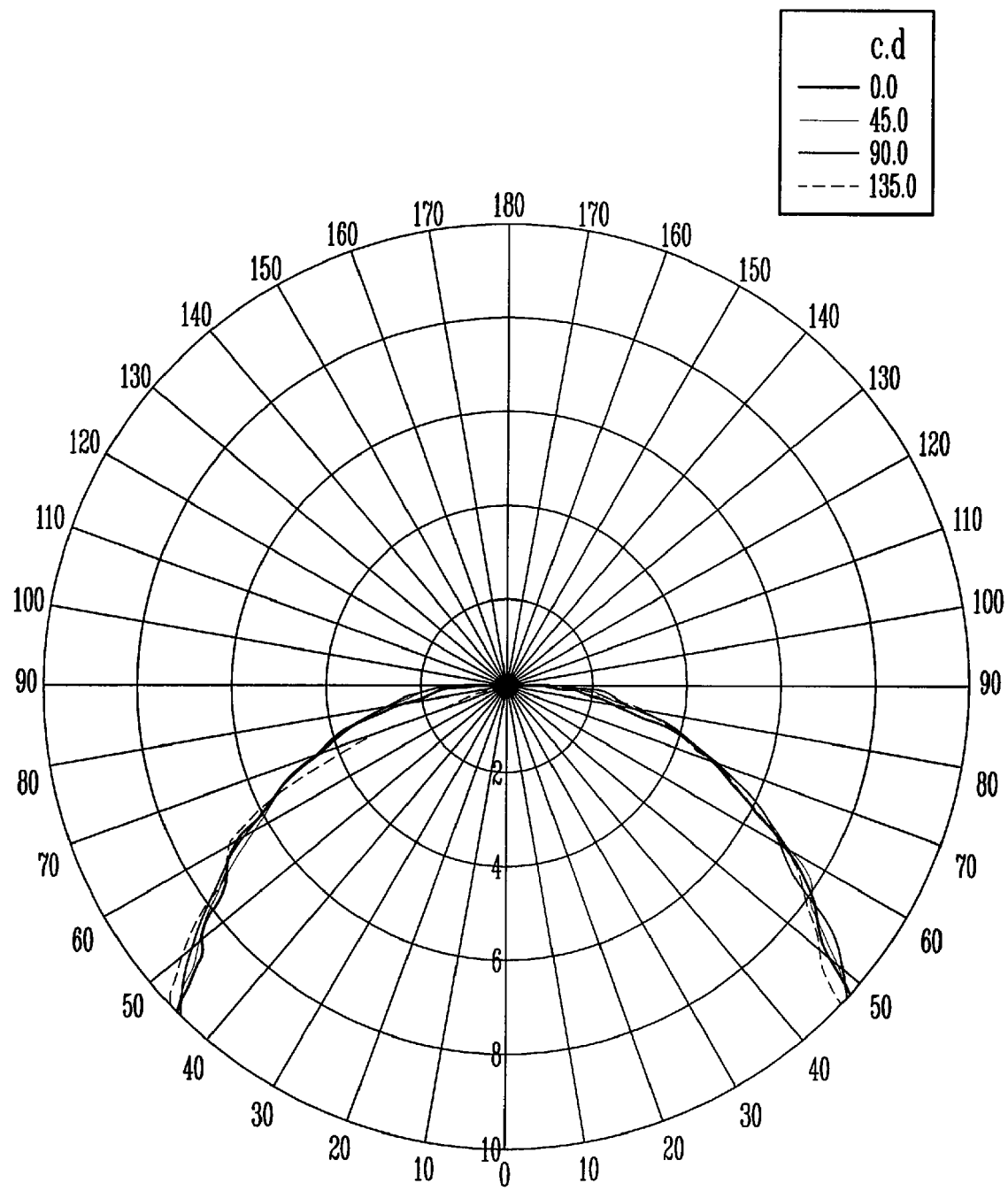
FIG. 9A is a polar plot of the intensity of a conventional high power LED.

Referring now to FIG. 9A in addition to FIG. 8B, the dispersion of light by an LED is typically oriented such that a region of maximum intensity is achieved directly above the apex 114 of the LED 108 with the intensity of emitted light falling off quickly as one moves away from the apex 114.

Referring now to FIG. 9B in addition to FIG. 8B, when the lens 104 is placed over the LED 108 illustratively having the light dispersal characteristic as illustrated in FIG. 9A, intensities of emitted light as measured as one moves from the apex 116 of the lens 104, which is incidentally co-aligned with the apex 114 of the LED 108, where intensities are the highest, to a wide angled position where intensities are lowest, vary relatively progressively and smoothly across the device's entire illumination field. In particular, although the intensity measured at the apex 116 of the lens 104 is still greater than elsewhere, the ratio of the intensities measured over the upper hemisphere of the lens 104 versus the intensity measured at the apex 116 are within a minimum percentage of the maximum intensity, illustratively about 50%. This is a particularly advantageous feature for lights to be used in conjunction with life saving devices as the projection of light over a wider range will increase the chances of recognition.

These improved illumination characteristics are generally attributed to the optimized disposition, roundness and curvature of the steps 110, the above being designed to offer a smoother control of light being transmitted and diffracted by the lens 102.

In the present example, the design of lens 102, that is the general disposition, roundness and curvature of steps 108, is suited for use with a wide angle surface mounted LED or bulb 108 (e.g. 120° rated bulb). As such, when the device 100 is used in omnidirectional mode with a wide angle bulb 108, a substantially smooth and progressive hemispherical light distribution may be attained to provide a substantially full hemispherical illumination. Combination of lens 102 with other types of light sources may also provide similar smoothing and progressive dispersion effects.

A person of skill in the art will understand that other types and variations of lens designs may be considered to modify the operative characteristics of the above light emitting devices without departing from the general scope and nature of the present disclosure. Namely, the general disposition, roundness and/or curvature of the steps 108 may be optimized to produce similar effects with different types of light sources. Also, by optimizing the dispersion and dissipation of light when the device is used in omnidirectional mode by adjusting the general shape and configuration of the stepped-surface or Fresnel-type lens (26, 102), one may chose not to include diffusive elements, as in 44 in FIG. 4, as hemispherical illumination may be sufficiently achieved by the modified lens alone. As will be understood by a person of skill in the art, the inclusion of diffusive elements, as in 44, may or may not be used in any design of devices 10 or 100 without modifying the general scope and nature of the present disclosure. Furthermore, specific lens designs to be used with different types of light sources for different applications where specific illumination characteristics and requirement may vary should also be apparent to a person of skill in the art.

Also, one may opt to include a rounded or spherical reflector in the device, as discussed hereinabove with reference to FIG. 3, to maximize the output of the device without altering its general functionality and operability. Finally, one of skill in the art will appreciate that the above illustrative embodiments may be modified in structure to accommodate various carrying means, such as straps, clips, belts, and other features of the like, required to customize the illustrated device for different applications.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

I claim:

1. An adjustable light emitting device for selectively projecting light directionally and omnidirectionally, the device comprising:
   a stepped surface lens having a focal point; and
   a light source positioned substantially along an optical axis of said lens and adapted for movement along said axis between said focal point and said lens.

2. The device of claim 1, further comprising a DC power source for powering said light source.

3. The device of claim 2, wherein said DC power source has a positive terminal and a negative terminal, and comprising a switch means selectively defining interconnections between said positive and negative terminals.

4. The device of claim 1, wherein said lens is a Fresnel lens.

5. The device of claim 4, wherein said Fresnel lens is substantially flat.

6. The device of claim 1, wherein said lens is a rounded stepped-surface lens.

7. The device of claim 6, wherein said stepped-surface lens comprises an inner surface, the light emitted by said light source being incident on said inner surface, said inner surface being a stepped surface.

8. The device of claim 7, wherein said stepped-surface lens comprises an outer surface, said outer surface being a generally smooth spherical surface.

9. The device of claim 1, further comprising a housing and a translucent light cap attached thereto, and further wherein said lens is incorporated into said light cap.

10. The device of claim 9, wherein said light source is mounted within said housing and said light cap is moveable relative to said housing along said optical axis.

11. The device of claim 9, wherein said lens is incorporated in a top portion of said cap, said cap further comprising an annular portion coupled at a first end to said lens and extending downwardly therefrom, and further wherein a second end of said annular portion is moveably coupled to said housing.

12. The device of claim 11, wherein said annular portion is movably coupled to said housing using a threaded interface.

13. The device of claim 11, wherein said annular portion comprises diffracting elements and further wherein when said relative distance is less then said focal length of said lens, the light is generally projected omnidirectionally both by divergence through said lens and by diffraction through said diffracting elements.

14. The device of claim 12, wherein when said relative distance is about equal to said focal length of said lens, the light is generally projected directionally by collimation through said lens.

15. The device of claim 1, wherein said light source is an LED.

16. The device of claim 1, further comprising a concave reflector for reflecting light not intercepted by said lens toward same, said light source positioned at a center of curvature of said reflector.

17. A light emitting device comprising:
   a partially collimated light source; and
   a lens;
   wherein light emitted by said light source passing through said lens is simultaneously projected in an arc of at least 180° upon leaving said lens and further wherein a first measured intensity of said projected light at a first point within said arc is at least one half of a maximum intensity of a second measured intensity of said projected light at a second point within said arc.

18. The device of claim 17, wherein said lens is one of a rounded stepped-surface lens and a Fresnel lens.

19. The device of claim 17, wherein said light source is an LED.

20. The device of claim 19, wherein said LED is a wide angle surface mounted LED.

21. A light sensing device comprising:
   a stepped surface lens comprising an outer surface, an inner surface, an optical axis and a focal point; and
   a light sensor positioned substantially at a location along said optical axis between said inner surface and said focal point;
   wherein light incident on a position on said outer surface is redirected by said lens substantially along a path between said position and said sensor.

22. The device of claim 21, wherein said lens is one of a rounded stepped-surface lens and a Fresnel lens.

23. The device of claim 21, further comprising a light source and switching electronics operationally interconnected between said light source and said light sensor, and further wherein when light is detected by said sensor, said switching electronics illuminate said light source.

* * * * *